United States Patent
Makino et al.

(10) Patent No.: US 10,560,213 B2
(45) Date of Patent: Feb. 11, 2020

(54) OPTICAL DEVICE

(71) Applicant: Fujitsu Optical Components Limited, Kawasaki-shi, Kanagawa (JP)

(72) Inventors: Shuntaro Makino, Kawasaki (JP); Kazumasa Takabayashi, Atsugi (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/369,259

(22) Filed: Mar. 29, 2019

(65) Prior Publication Data

US 2019/0372699 A1    Dec. 5, 2019

(30) Foreign Application Priority Data

Jun. 1, 2014 (JP) ................. 2018-106540

(51) Int. Cl.
| | |
|---|---|
| *H04J 14/06* | (2006.01) |
| *G02B 27/28* | (2006.01) |
| *G02F 1/225* | (2006.01) |
| *H04B 10/40* | (2013.01) |
| *G02F 1/21* | (2006.01) |

(52) U.S. Cl.
CPC ............ *H04J 14/06* (2013.01); *G02B 27/286* (2013.01); *G02F 1/225* (2013.01); *H04B 10/40* (2013.01); *G02F 2001/212* (2013.01)

(58) Field of Classification Search
CPC ....... H04B 10/40; H04J 14/06; G02B 27/286; G02F 1/225; G02F 2001/212
USPC .......................................................... 398/65
See application file for complete search history.

(56) References Cited

U.S. PATENT DOCUMENTS

| | | | |
|---|---|---|---|
| 4,669,815 A * | 6/1987 | Thaniyavarn | G02B 6/126 385/11 |
| 5,119,453 A | 6/1992 | Gonthier et al. | |
| 5,694,496 A * | 12/1997 | Ando | C08G 73/1039 385/11 |
| 6,850,712 B1 * | 2/2005 | Delavaux | H04B 10/2537 398/183 |
| 2012/0063716 A1 * | 3/2012 | Mizuno | G02B 6/12007 385/11 |
| 2013/0010345 A1 | 1/2013 | Doi et al. | |

(Continued)

FOREIGN PATENT DOCUMENTS

| | | |
|---|---|---|
| JP | 2-287408 | 11/1990 |
| JP | 2006-65089 | 3/2006 |
| JP | 2011-34057 | 2/2011 |

*Primary Examiner* — Dalzid E Singh
(74) *Attorney, Agent, or Firm* — Staas & Halsey LLP (57) ABSTRACT

An optical device includes an optical coupler that performs branching of the input light and outputs a first-type branched light and a second-type branched light; a polarization converter that changes the direction of polarization of the second-type branched light output from the optical coupler; and a polarization synthesizer that outputs a polarization multiplexed light by synthesizing the first-type branched light, which is output from the optical coupler, and the second-type branched light, which has the direction of polarization changed by the polarization converter. The optical coupler has the wavelength characteristic that cancels out the wavelength characteristic of the polarization synthesizer regarding the second-type branched light included in the polarization multiplexed light.

5 Claims, 5 Drawing Sheets

(56) References Cited

U.S. PATENT DOCUMENTS

2013/0094797 A1* 4/2013 Zheng .................... G02F 1/225
                                                        385/3
2015/0063809 A1* 3/2015 Sugiyama ............... H04J 14/06
                                                        398/65

* cited by examiner

OPTICAL DEVICE

CROSS-REFERENCE TO RELATED APPLICATION

This application is based upon and claims the benefit of priority of the prior Japanese Patent Application No. 2018-106540, filed on Jun. 1, 2018, the entire contents of which are incorporated herein by reference.

FIELD

The embodiment discussed herein is related to an optical device.

BACKGROUND

In recent years, accompanying the expansion of the transmission capacity of optical communication, optical devices in which optical polarization division multiplexing is implemented are sometimes used. The optical polarization division multiplexing represents a transmission system in which two independent sets of data are transmitted at once using polarization multiplexed light that is formed by synthesizing signal lights whose directions of polarization are mutually orthogonal.

In an optical device in which optical polarization division multiplexing is implemented, the input light that is input to the optical device gets branched into two branched lights by an optical coupler, and the direction of polarization of one branched light is changed using a polarization converter. Then, the branched light having the changed direction of polarization and the branched light having the unchanged direction of polarization are synthesized using a polarization synthesizer, and the result is output as the polarization multiplexed light. From the perspective of achieving downsizing of the optical device; the optical coupler, the polarization converter, and the polarization synthesizer are mounted on, for example, a single substrate. As the optical coupler and the polarization synthesizer, for example, directional couplers are used that perform optical coupling of two waveguides.

[Patent Literature 1] Japanese Laid-open Patent Publication No. 2006-65089

[Patent Literature 2] Japanese Laid-open Patent Publication No. 2-287408

[Patent Literature 3] Japanese Laid-open Patent Publication No. 2011-34057

Regarding one of the two branched lights included in the polarization multiplexed light, a polarization synthesizer has the wavelength characteristic that the optical power goes on decreasing as the wavelength of the light approaches the end portion of a predetermined wavelength band assigned to the polarization multiplexed light (hereinafter, called an "operating wavelength band"). Thus, in an optical device in which optical polarization division multiplexing is implemented, there is a possibility of deterioration in the polarization multiplexed light due to such a wavelength characteristic of the polarization synthesizer. That is, regarding one of the two branched lights included in the polarization multiplexed light output from the polarization synthesizer, there is a risk that the minimum value of the optical power of the concerned branched light drops to a range that is equal to or below the specifications value allowed in advance at the end portion of the operating wavelength band.

SUMMARY

According to an aspect of an embodiment, an optical device includes an optical coupler that performs branching of input light and outputs first-type branched light and second-type branched light; a polarization converter that changes direction of polarization of the second-type branched light output from the optical coupler; and a polarization synthesizer that outputs polarization multiplexed light by synthesizing the first-type branched light, which is output from the optical coupler, and the second-type branched light, which has direction of polarization changed by the polarization converter, wherein the optical coupler has wavelength characteristic that cancels out wavelength characteristic of the polarization synthesizer regarding the second-type branched light included in the polarization multiplexed light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiment of the present invention will be explained with reference to accompanying drawings. However, the disclosed technology is not limited by the embodiment described below.

Figure 1:
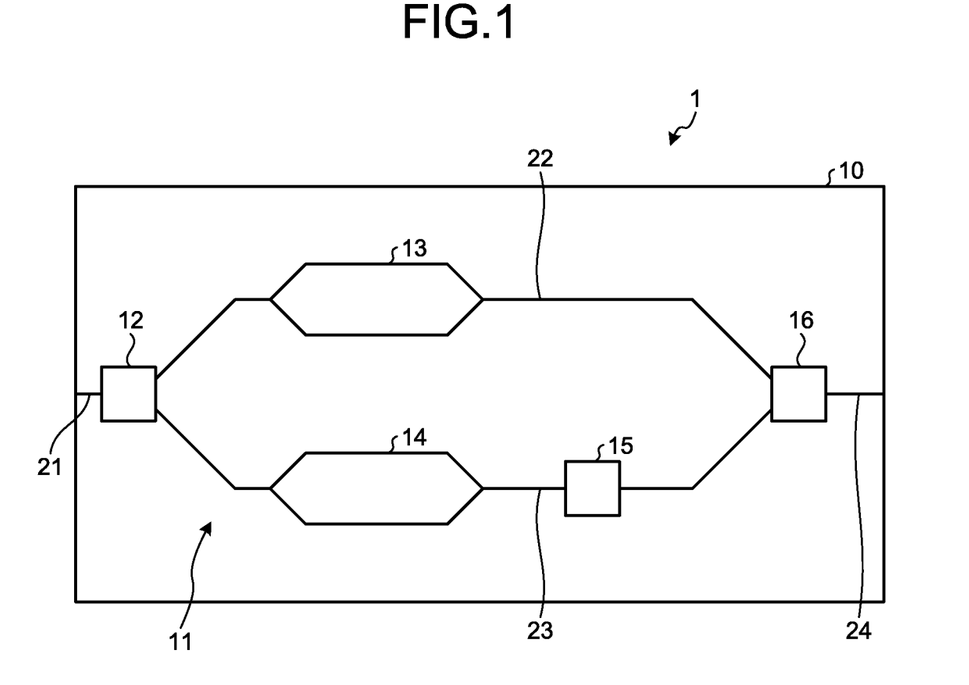
FIG. 1 is a diagram illustrating an exemplary configuration of an optical device according to an embodiment.

FIG. 1 is a diagram illustrating an exemplary configuration of an optical device 1 according to the embodiment. The optical device 1 illustrated in FIG. 1 includes a substrate 10, an optical waveguide 11, an optical coupler 12, optical modulators 13 and 14, a polarization converter 15, and a polarization synthesizer 16. Thus, in the optical device 1, optical polarization division multiplexing is implemented.

The substrate 10 is used to mount the optical waveguide 11, the optical coupler 12, the optical modulators 13 and 14, the polarization converter 15, and the polarization synthesizer 16.

The optical waveguide 11 is formed on the substrate 10. The optical waveguide 11 includes an input waveguide 21 to which the input light emitted from a light source is input; includes branching waveguides 22 and 23; and includes an output waveguide 24 that is meant for outputting a polarization multiplexed light.

The optical coupler 12 is connected to the input waveguide 21 and to the branching waveguides 22 and 23, and performs optical branching. That is, the optical coupler 12 branches the input light, which is input thereto from the input waveguide 21, into two branched lights; outputs one branched light to the branching waveguide 22; and outputs the other branched light to the branching waveguide 23. In the following explanation, the branched light that is output from the optical coupler 12 to the branching waveguide 22 is called a "first-type branched light", and the branched light that is output from the optical coupler 12 to the branching waveguide 23 is called a "second-type branched light". Regarding the configuration of the optical coupler 12, the details are given later.

The optical modulator 13 is disposed in the branching waveguide 22 and, for example, includes the optical waveguide of the Mach-Zehnder type. The optical modulator 13 modulates the first-type branched light, which is output from the optical coupler 12; using electrical signals; and outputs the modulated first-type branched light to the polarization synthesizer 16. The optical modulator 14 is disposed in the branching waveguide 23 and, for example, includes the optical waveguide of the Mach-Zehnder type. The optical modulator 14 modulates the second-type branched light, which is output from the optical coupler 12, using electrical signals; and outputs the modulated second-type branched light to the polarization convertor 15.

The polarization converter 15 is disposed in the branching waveguide 23 and changes the direction of polarization of the second-type branched light that is output from the optical modulator 14.

The polarization synthesizer 16 is connected to the output waveguide 24 and to the branching waveguides 22 and 23, and performs optical synthesis. That is, the polarization synthesizer 16 synthesizes the first-type branched light, which is output from the optical modulator 13, and the second-type branched light, which has the direction of polarization changed as a result of passing through the polarization converter 15; and outputs a polarization multiplexed light, which includes two branched lights having mutually orthogonal directions of polarization, to the output waveguide 24.

Figure 2:
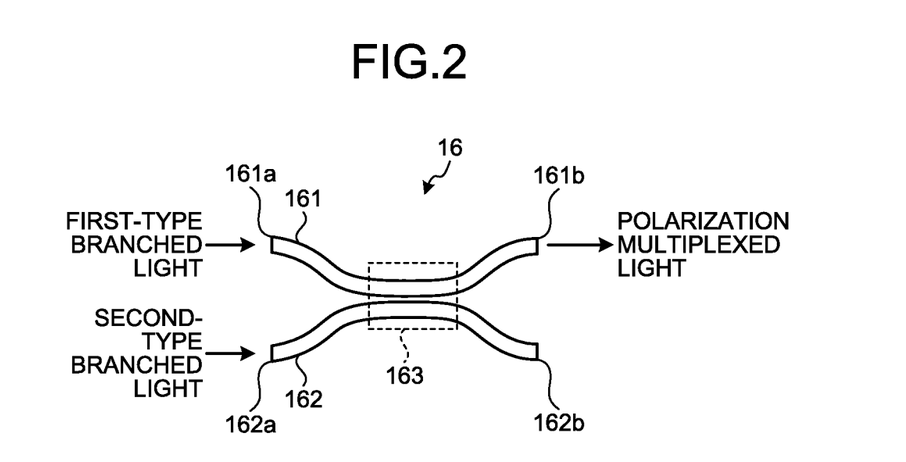
FIG. 2 is a diagram illustrating an exemplary configuration of a polarization synthesizer according to the embodiment.

FIG. 2 is a diagram illustrating an exemplary configuration of the polarization synthesizer 16 according to the embodiment. The polarization synthesizer 16 is a symmetrical directional coupler and, as illustrated in FIG. 2, includes two optical waveguides 161 and 162 having identical width. In the optical waveguide 161, an input end 161a is connected to the branching waveguide 22, and an output end 161b is connected to the output waveguide 24. In the optical waveguide 162, an input end 162a is connected to the branching waveguide 23, and an output end 162b is a terminal end. The optical waveguides 161 and 162 constitute an area 163 within which the optical waveguides 161 and 162 come close to each other and in which optical coupling takes place. That is, the first-type branched light, which is output from the optical modulator 13, gets input from the input end 161a of the optical waveguide 161, and passes through the optical waveguide 161. The second-type branched light, which has passed through the polarization converter 15 and which has the changed direction of polarization, is input from the input end 162a of the optical waveguide 162 and gets coupled with the optical waveguide 161 in the area 163. As a result, the first-type branched light and the second-type branched light that have mutually orthogonal directions of polarization get coupled in the optical waveguide 161, and the resultant polarization multiplexed light is output from the output end 161b of the optical waveguide 161 to the output waveguide 24.

Figure 3:
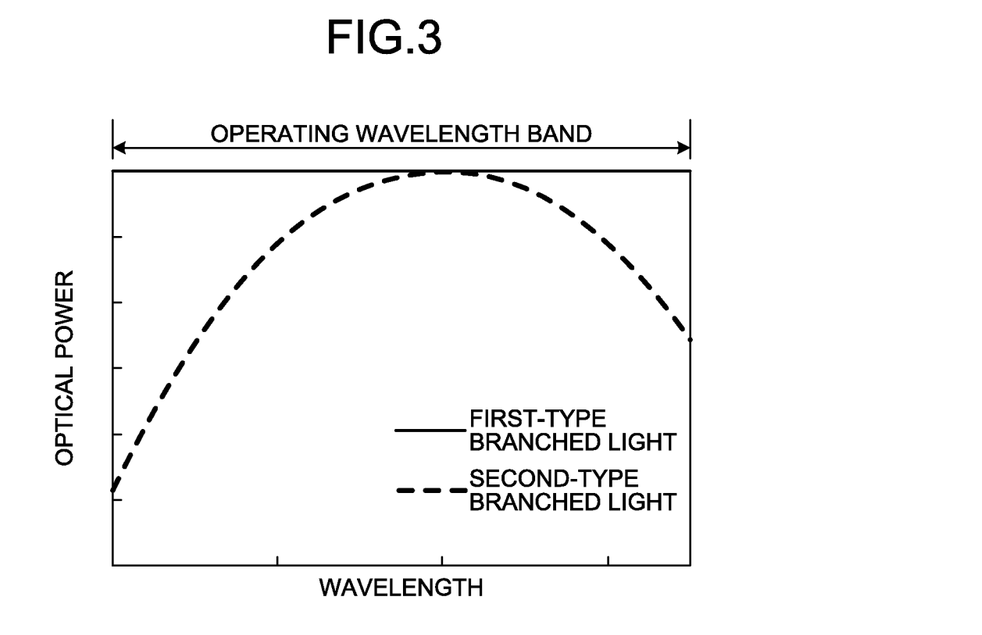
FIG. 3 is a diagram illustrating an example of the wavelength characteristic of the polarization synthesizer according to the embodiment.

FIG. 3 is a diagram illustrating an example of the wavelength characteristic of the polarization synthesizer 16 according to the embodiment. With reference to FIG. 3, the horizontal axis represents the wavelength of the light, and the vertical axis represents the optical power of the light output from the polarization synthesizer 16. Regarding the first-type branched light and the second-type branched light included in the polarization multiplexed light, the polarization synthesizer 16 has the waveform characteristic as illustrated in FIG. 3, for example. That is, regarding the first-type branched light included in the polarization multiplexed light, the waveform characteristic of the polarization synthesizer 16 is such that the optical power remains constant regardless of the wavelength of the light. Regarding the second-type branched light included in the polarization multiplexed light, the waveform characteristic of the polarization synthesizer 16 is such that the optical power goes on decreasing as the wavelength of the light approaches the end portion of a predetermined wavelength band (hereinafter, called the "operating wavelength band") assigned to the polarization multiplexed light.

Thus, in the optical device 1, due to the wavelength characteristic of the polarization synthesizer 16 as illustrated in FIG. 3, there is a possibility of deterioration in the polarization multiplexed light that is output from the polarization synthesizer 16. That is, regarding the second-type branched light included in the polarization multiplexed light output from the polarization synthesizer 16, there is a risk that the minimum value of the optical power of the second-type branched light drops to a range that is equal to or below the specifications value allowed in advance at the end portion of the operating wavelength band.

In that regard, in the optical device 1, the wavelength characteristic of the optical coupler 12 is such that cancels out the wavelength characteristic of the polarization synthesizer 16 regarding the second-type branched light included in the polarization multiplexed light.

Figure 4:
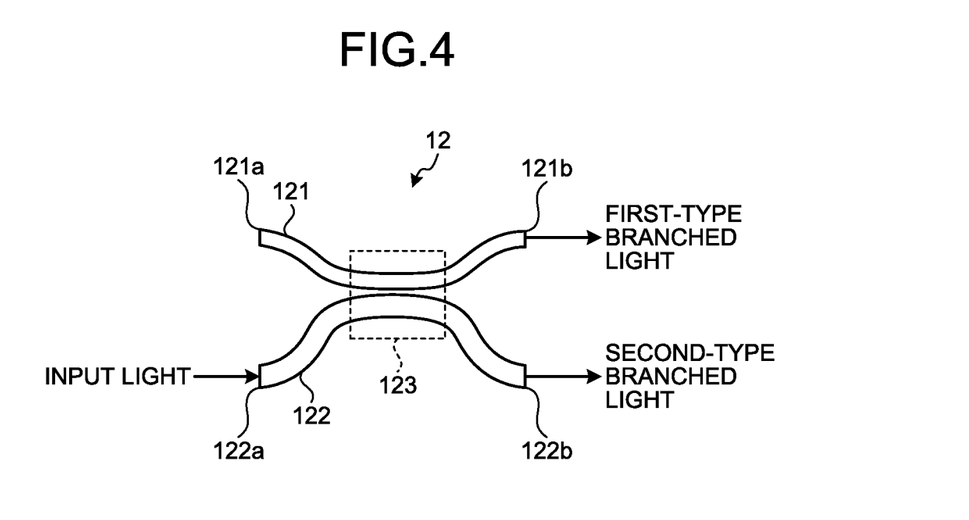
FIG. 4 is a diagram illustrating an exemplary configuration of an optical coupler according to the embodiment.

Herein, prior to explaining the wavelength characteristic of the optical coupler 12, the configuration of the optical coupler 12 is explained as a premise. FIG. 4 is a diagram illustrating an exemplary configuration of the optical coupler 12 according to the embodiment. The optical coupler 12 is a nonsymmetrical directional coupler and, as illustrated in FIG. 4, includes two optical waveguides 121 and 122 having different widths. In the embodiment, the optical waveguide 122 has a greater width than the width of the optical waveguide 121. In the optical waveguide 121, an input end 121a is a terminal end, and an output end 121b is connected to the branching waveguide 22. In the optical waveguide 122, an input end 122a is connected to the input waveguide 21, and an output end 122b is connected to the branching waveguide 23. The optical waveguides 121 and 122 constitute an area 123 within which the optical waveguides 121 and 122 come close to each other and in which optical coupling takes place. That is, the input light that is input from the input waveguide 21 gets input to the input end 122a of the optical waveguide 122, and passes through the optical waveguide 122. Moreover, some part of the input light that passes through the optical waveguide 122 gets coupled with the optical waveguide 121 in the area 123. As a result, the input light gets branched into the first-type branched light and the second-type branched light. Then, the first-type branched light gets output from the output end 121b of the optical waveguide 121 to the branching waveguide 22, and the second-type branched light gets output from the output end 122b of the optical waveguide 122 to the branching waveguide 23.

Figure 5:
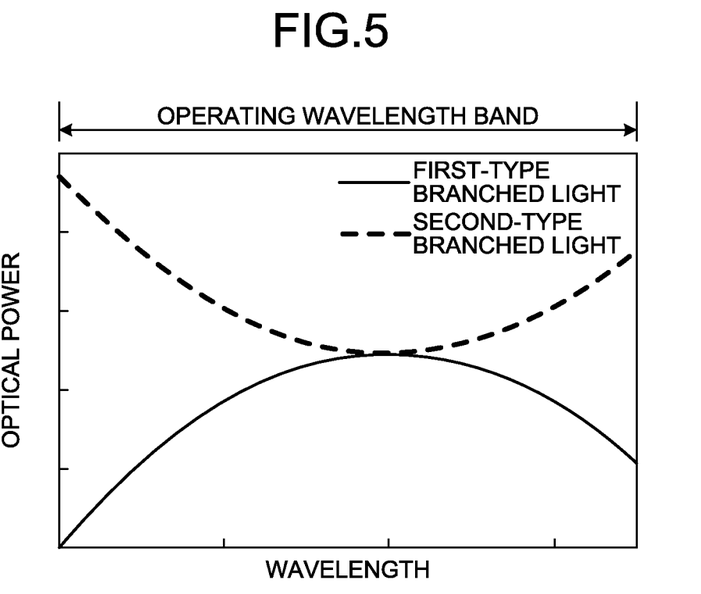
FIG. 5 is a diagram illustrating an example of the wavelength characteristic of the optical coupler according to the embodiment.

FIG. 5 is a diagram illustrating an example of the wavelength characteristic of the optical coupler 12 according to the embodiment. With reference to FIG. 5, the horizontal axis represents the optical wavelength, and the vertical axis represents the optical power of the light that is output from the optical coupler 12. Regarding the first-type branched light and the second-type branched light output therefrom, the optical coupler 12 has the wavelength characteristic as illustrated in FIG. 5, for example. That is, regarding the first-type branched light output from the optical coupler 12, the wavelength characteristic of the optical coupler 12 is such that the optical power goes on decreasing as the wavelength of the light approaches the end portion of the operating wavelength band. Moreover, regarding the second-type branched light output from the optical coupler 12, the wavelength characteristic of the optical coupler 12 is such that the optical power goes on increasing as the wavelength of the light approaches the end portion of the operating wavelength band. Because of the wavelength characteristic of the optical coupler 12 regarding the second-type branched light, the wavelength characteristic of the polarization synthesizer 16 regarding the second-type branched light as illustrated in FIG. 3 gets cancelled out. As a result, it becomes possible to hold down the deterioration in the polarization multiplexed light attributed to the wavelength characteristic of the polarization synthesizer 16.

The wavelength characteristic of the optical coupler 12 as illustrated in FIG. 5 is decided in such a way that the ratio of optical powers of the first-type branched light and the second-type branched light output from the optical coupler 12 becomes equal to the reciprocal of the ratio of optical powers of the first-type branched light and the second-type branched light included in the polarization multiplex light that is output from the polarization synthesizer 16. Regarding the first-type branched light and the second-type branched light included in the polarization multiplex light that is output from the polarization synthesizer 16, a ratio Ratio_PBC ($\lambda$) of optical powers is expressed using Equation (1) given below.

$$\text{Ratio\_PBC}(\lambda) = P_{b2}(\lambda)/P_{b1}(\lambda) \quad (1)$$

Herein, $\lambda$ represents the wavelength of the light; $P_{b1}(\lambda)$ represents the optical power of the first-type branched light included in the polarization multiplexed light that is output from the polarization synthesizer 16; and $P_{b2}(\lambda)$ represents the optical power of the second-type branched light included in the polarization multiplexed light that is output from the polarization synthesizer 16.

Regarding the first-type branched light and the second-type branched light output from the optical coupler 12, a ratio Ratio_Coupler ($\lambda$) of optical powers is expressed using Equation (2) given below.

$$\text{Ratio\_Coupler}(\lambda) = P_{c2}(\lambda)/P_{c1}(\lambda) \quad (2)$$

Herein, $\lambda$ represents the wavelength of the light; $P_{c1}(\lambda)$ represents the optical power of the first-type branched light output from the optical coupler 12; and $P_{c2}(\lambda)$ represents the optical power of the second-type branched light output from the optical coupler 12.

Thus, the wavelength characteristic of the optical coupler 12 is decided in such a way that Equation (3) given below is satisfied.

$$\text{Ratio\_Coupler}(\lambda) = 1/\text{Ratio\_PBC}(\lambda) \quad (3)$$

However, in practice, it is difficult to design the wavelength characteristic of the optical coupler 12 in such a way that Equation (3) is satisfied at all wavelengths in the operating wavelength area. Hence, the wavelength characteristic of the optical coupler 12 can be adjusted in such a way that the value of integral of the absolute value of the difference between Ratio_Coupler ($\lambda$) and 1/Ratio_PBC ($\lambda$) becomes the smallest.

Meanwhile, examples of the parameters meant for adjusting the wavelength characteristic of the optical coupler 12 include the widths of the optical waveguides 121 and 122 and the clearance gap between the optical waveguides 121 and 122 in the area 123. Thus, by adjusting the widths of the optical waveguides 121 and 122 to appropriate values and by adjusting the clearance gap between the optical waveguides 121 and 122 in the area 123 to an appropriate value, the manufacturer of the optical device 1 can design the wavelength characteristic of the optical coupler 12 in such a way that Equation (3) given above is satisfied.

Figure 6:
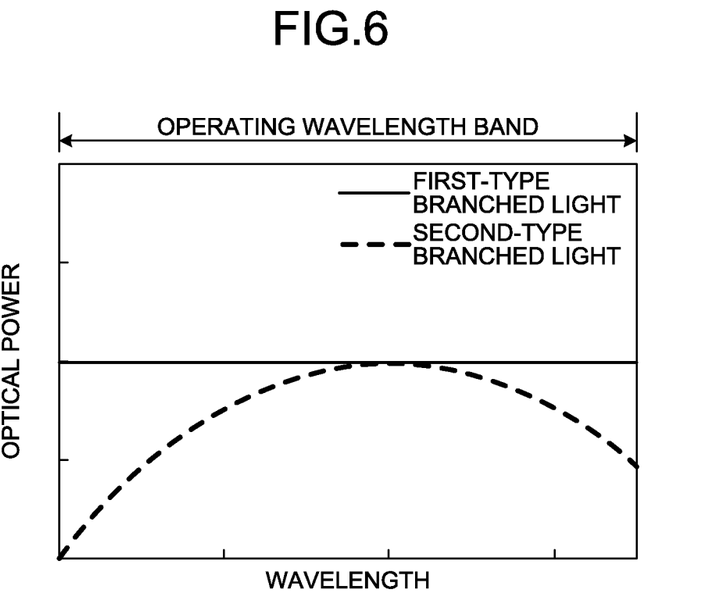
FIG. 6 is a diagram illustrating an example of the waveform characteristics of the optical powers of the branched lights, which are included in the polarization multiplexed light output from the polarization synthesizer, in the case when an optical coupler according to a comparison example was used.
Figure 7:
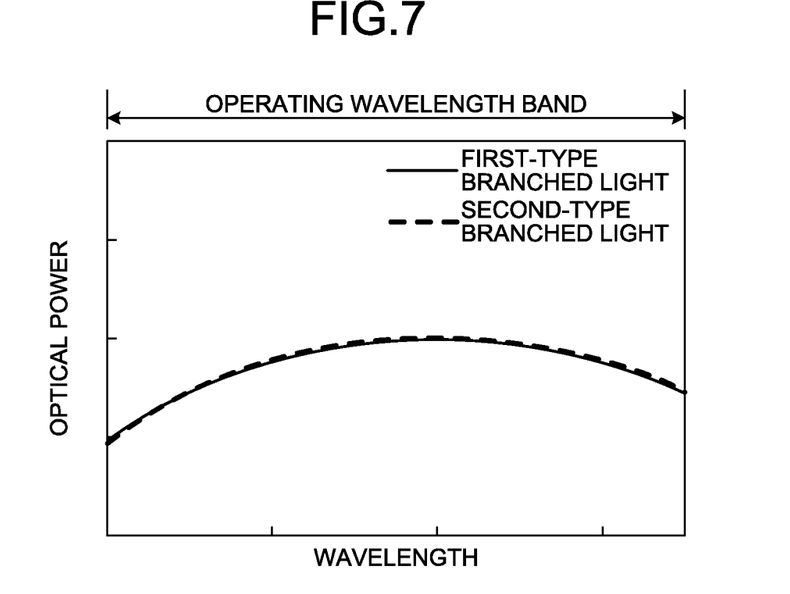
FIG. 7 is a diagram illustrating an example of the waveform characteristics of the optical powers of the branched lights, which are included in the polarization multiplexed light output from the polarization synthesizer, in the case when the optical coupler according to the embodiment was used.

Explained below with reference to FIGS. 6 and 7 are the changes that occur in the output of the polarization synthesizer 16 due to the wavelength characteristic of the optical coupler 12. FIG. 6 is a diagram illustrating an example of the waveform characteristics of the optical powers of the branched lights, which are included in the polarization multiplexed light output from the polarization synthesizer 16, in the case when an optical coupler according to a comparison example was used. FIG. 7 is a diagram illustrating an example of the waveform characteristics of the optical powers of the branched lights, which are included in the polarization multiplexed light output from the polarization synthesizer 16, in the case when the optical coupler 12 according to the embodiment was used. The waveform characteristic of the optical coupler according to the comparison example is such that, regarding the first-type branched light and the second-type branched light output from the optical coupler, the optical power remains constant regardless of the wavelength of the light. On the other hand, regarding the first-type branched light and the second-type branched light output therefrom, the optical coupler 12 has the wavelength characteristic as illustrated in FIG. 5.

As illustrated in FIG. 6, when the optical coupler according to the comparison example was used, due to the wavelength characteristic of the polarization synthesizer 16, the smallest value of the optical power of the second-type branched light included in the polarization multiplexed light dropped to a range that is equal to or below the specifications value allowed in advance at the end portion of the operating wavelength band.

In contrast, when the optical coupler 12 according to the embodiment is used, the wavelength characteristic of the polarization synthesizer 16 regarding the second-type branched light gets cancelled out by the wavelength characteristic of the optical coupler 12 regarding the second-type branched light. Hence, when the optical coupler 12 according to the embodiment was used, the smallest value of the optical power of the second-type branched light included in the polarization multiplexed light improved in the end portion of the operating wavelength band, and satisfied the specifications value allowed in advance. That is, as a result of using the optical coupler 12, it became possible to hold down the deterioration in the polarization multiplexed light attributed to the wavelength characteristic of the polarization synthesizer 16.

As described above, the optical device 1 according to the embodiment includes the optical coupler 12, the polarization converter 15, and the polarization synthesizer 16. The optical coupler 12 performs branching of the input light, and outputs the first-type branched light and the second-type branched light. The polarization converter 15 changes the direction of polarization of the second-type branched light output from the optical coupler 12. The polarization synthesizer 16 synthesizes the first-type branched light, which is output from the optical coupler 12, with the second-type branched light, which has the direction of polarization changed by the polarization converter 15; and outputs a polarization multiplexed light. In the optical device 1, the optical coupler 12 has the wavelength characteristic that cancels out the wavelength characteristic of the polarization synthesizer 16 regarding the second-type branched light included in the polarization multiplexed light.

With such a configuration of the optical device 1, it becomes possible to hold down the deterioration in the polarization multiplexed light attributed to the wavelength characteristic of the polarization synthesizer 16.

Modification Example

Figure 8:
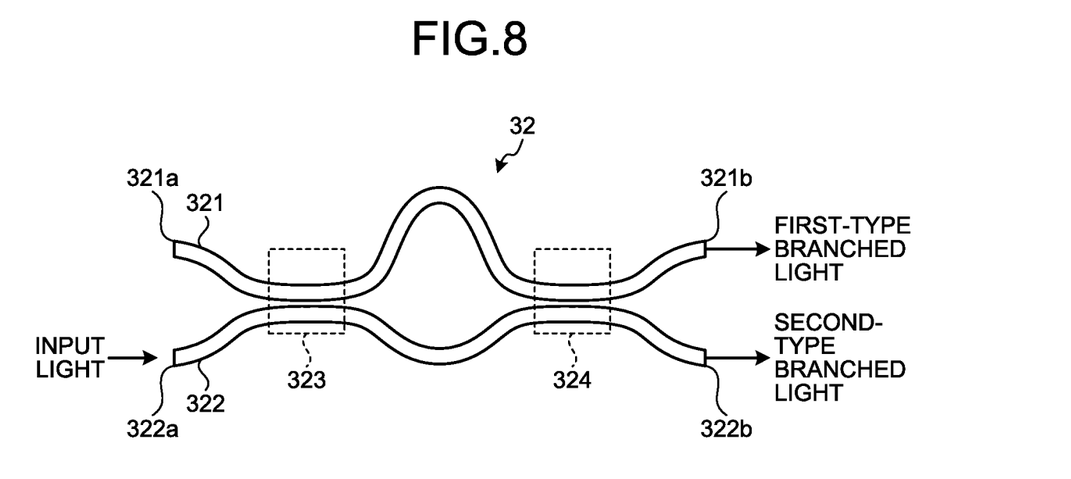
FIG. 8 is a diagram illustrating an exemplary configuration of an optical coupler according to a modification example.

In the embodiment described above, the explanation is given for an example in which the optical coupler 12 is a nonsymmetrical directional coupler. However, the disclosed technology is not limited to that case. Alternatively, for example, the optical coupler can be a nonsymmetrical Mach-Zehnder interferometer. FIG. 8 is a diagram illustrating an exemplary configuration of an optical coupler 32 according to a modification example.

The optical coupler 32 is a nonsymmetrical Mach-Zehnder interferometer and, as illustrated in FIG. 8, includes two optical waveguides 321 and 322 having identical width but having different lengths. In the optical waveguide 321, an input end 321a is a terminal end, and an output end 321b is connected to the branching waveguide 22. In the optical waveguide 322, an input end 322a is connected to the input waveguide 21, and an output end 322b is connected to the branching waveguide 23. The optical waveguides 321 and 322 constitute areas 323 and 324 within which the optical waveguides 321 and 322 come close to each other and in which optical coupling takes place. Thus, the input light that is input from the input waveguide 21 gets input from the input end 322a of the optical waveguide 322 and passes through the optical waveguide 322. Moreover, some part of the input light that passes through the optical waveguide 322 gets coupled with the optical waveguide 321 in the areas 323 and 324. As a result, the input light gets branched into the first-type branched light and the second-type branched light. Then, the first-type branched light gets output from the output end 321b of the optical waveguide 321 to the branching waveguide 22, and the second-type branched light gets output from the output end 322b of the optical waveguide 322 to the branching waveguide 23.

In an identical manner to the optical coupler 12, the optical coupler 32 too has the wavelength characteristic that cancels out the wavelength characteristic of the polarization synthesizer 16 regarding the second-type branched light included in the polarization multiplexed light. Regarding the first-type branched light and the second-type branched light output from therefrom, the optical coupler 32 has the wavelength characteristic as illustrated in FIG. 5, for example.

Herein, examples of the parameters meant for adjusting the waveform characteristic of the optical coupler 32 include the difference in the lengths of the two optical waveguides 321 and 322. Thus, for example, by adjusting the difference in the lengths of the two optical waveguides 321 and 322 to an appropriate value, the manufacturer of the optical device 1 can design the wavelength characteristic of the optical coupler 32 in such a way that Equation (3) given above is satisfied.

Meanwhile, in the embodiment described above, the explanation is given for an example in which the optical modulator 13 is disposed in the branching waveguide 22, and the optical modulator 14 is disposed in the branching waveguide 23. Alternatively, instead of using the optical modulators 13 and 14, some other components can be disposed in the branching waveguides 22 and 23. Examples of some other components disposed in the branching waveguides 22 and 23 include optical filters that transmit the light having particular wavelengths.

Examples of Application

Figure 9:
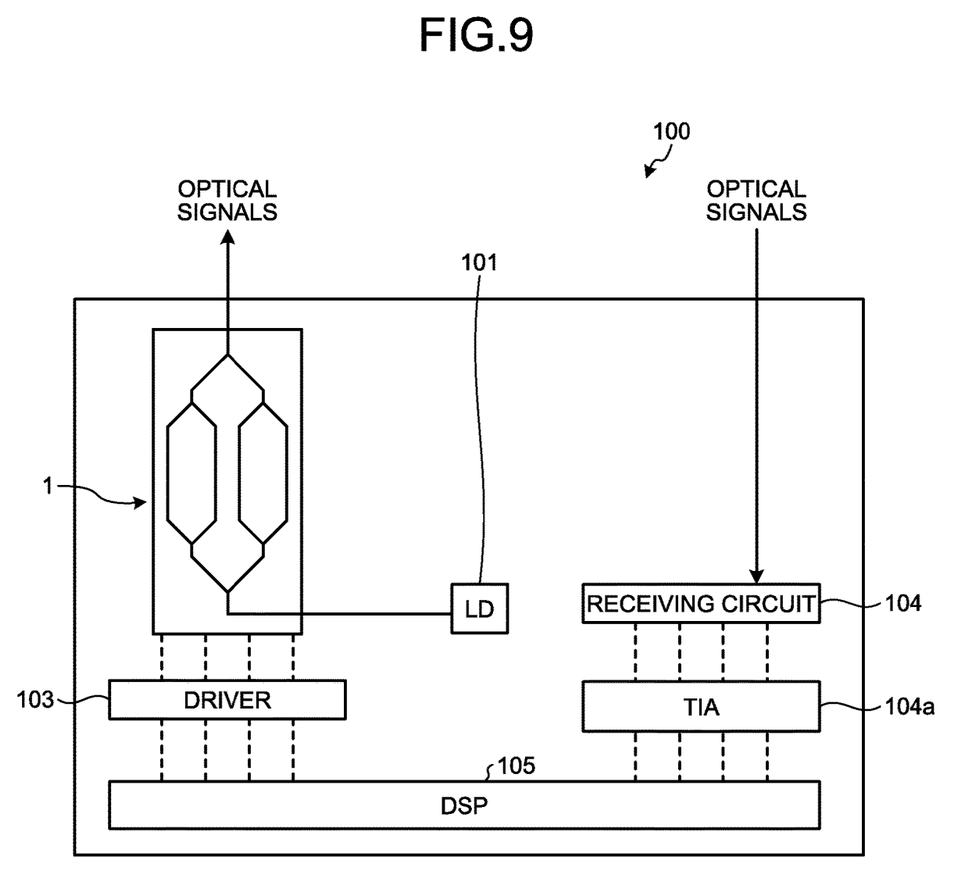
FIG. 9 is a diagram illustrating an exemplary configuration of an optical transmitter and receiver module in which the optical device either according to the embodiment or according to the modification example is installed.

The optical device 1 described above can be applied in optical transmitter and receiver modules. FIG. 9 is a diagram illustrating an exemplary configuration of an optical transmitter and receiver module 100 in which the optical device 1 either according to the embodiment or according to the modification example is installed. As illustrated in FIG. 9, the optical transmitter and receiver module 100 includes a laser diode (LD) 101, the optical device 1, a driver 103, a receiving circuit 104, and a digital signal processor (DSP) 105. The receiving circuit 104 further includes a transimpedance amplifier (TIA) 104a. The optical modulators 13 and 14 are driven by radio-frequency (RF) signals output from the driver 103. Then, the optical device 1 performs modulation and polarization multiplexing of the first-type branched light and the second-type branched light obtained as a result of branching of the input light coming from the LD 101, and transmits the obtained polarization multiplexed light as optical signals.

The receiving circuit 104 receives the optical signals, performs a predetermined light reception operation such as photoelectric conversion, and outputs the obtained received signals to the DSP 105 via the TIA 104a.

The DSP 105 performs predetermined digital signal processing such as digital demodulation and decoding with respect to the received signals that are output from the receiving circuit 104. Moreover, the DSP 105 performs predetermined digital signal processing such as encoding and digital modulation with respect to transmission data, and outputs the obtained data signals to the driver 103. Then, the driver 103 converts the data signals into RF signals to be used in optical modulation, and the RF signals drive the optical modulators 13 and 14 of the optical device 1.

According to an aspect of the optical device disclosed in the application concerned, it becomes possible to hold down the deterioration in the polarization multiplexed light attributed to the wavelength characteristic of the polarization synthesizer.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical device comprising:
    an optical coupler that performs branching of input light and outputs first-type branched light and second-type branched light;
    a polarization converter that changes direction of polarization of the second-type branched light output from the optical coupler; and
    a polarization synthesizer that outputs polarization multiplexed light by synthesizing the first-type branched light, which is output from the optical coupler, and the second-type branched light, which has direction of polarization changed by the polarization converter, wherein
    the polarization synthesizer has, regarding the second-type branched light included in the polarization multiplexed light, wavelength characteristic where optical power goes on decreasing as wavelength of light approaches end portion of a predetermined wavelength band assigned to the polarization multiplexed light, and
    the optical coupler has wavelength characteristic that cancels out the wavelength characteristic of the polarization synthesizer regarding the second-type branched light included in the polarization multiplexed light.

2. The optical device according to claim 1, wherein
    the optical coupler has, regarding the second-type branched light output from the optical coupler, wavelength characteristic where optical power goes on increasing as wavelength of light approaches the end portion of the predetermined wavelength band.

3. The optical device according to claim 1, wherein wavelength characteristic of the optical coupler is decided in such a way that ratio of optical powers of the first-type branched light and the second-type branched light output from the optical coupler becomes equal to reciprocal of ratio of optical powers of the first-type branched light and the second-type branched light included in the polarization multiplex light that is output from the polarization synthesizer.

4. The optical device according to claim 1, wherein the optical coupler is a nonsymmetrical directional coupler that includes two optical waveguides having different widths.

5. The optical device according to claim 1, wherein the optical coupler is a nonsymmetrical Mach-Zehnder interferometer that includes two optical waveguides having identical width but having different lengths.

* * * * *